(12) United States Patent
Bourdelais et al.

(10) Patent No.: US 6,835,693 B2
(45) Date of Patent: Dec. 28, 2004

(54) COMPOSITE POSITIONING IMAGING ELEMENT

(75) Inventors: Robert P. Bourdelais, Pittsford, NY (US); Cheryl J. Kaminsky, Rochester, NY (US); Loretta E. Allen, Hilton, NY (US)

(73) Assignee: Eastman Kodak Company, Rochester, NY (US)

( * ) Notice: Subject to any disclaimer, the term of this patent is extended or adjusted under 35 U.S.C. 154(b) by 113 days.

(21) Appl. No.: 10/292,853

(22) Filed: Nov. 12, 2002

(65) Prior Publication Data

US 2004/0092399 A1 May 13, 2004

(51) Int. Cl.⁷ .................. B41M 5/035; B41M 5/38; B41M 5/00
(52) U.S. Cl. ................. 503/227; 428/32.12; 428/32.51
(58) Field of Search .................... 428/32.12, 32.51; 430/536; 503/227

(56) References Cited

U.S. PATENT DOCUMENTS

| | | |
|---|---|---|
| 4,777,067 A | 10/1988 | Woronow et al. ............. 428/39 |
| 4,984,823 A | 1/1991 | Ishii et al. .................... 283/81 |
| 5,292,154 A | 3/1994 | Williams ....................... 283/2 |
| 5,302,574 A | 4/1994 | Lawrence et al. .......... 503/227 |
| 5,387,571 A | 2/1995 | Daly .......................... 503/227 |
| 5,507,166 A | 4/1996 | Orlick et al. ................. 72/344 |
| 6,045,965 A | 4/2000 | Cournoyer et al. ......... 430/263 |
| 6,153,367 A | 11/2000 | Gula et al. .................. 430/496 |
| 6,261,994 B1 * | 7/2001 | Bourdelais et al. ......... 503/227 |
| 6,344,310 B1 | 2/2002 | Bourdelais et al. ......... 430/263 |
| 6,436,604 B1 | 8/2002 | Bourdelais et al. ......... 430/432 |

* cited by examiner

*Primary Examiner*—Bruce H. Hess
(74) *Attorney, Agent, or Firm*—Paul A. Leipold (57) ABSTRACT

The invention relates to an imaging member comprising in order an imaging layer, an upper oriented polymer sheet, a laminating adhesive layer in contact with said upper polymer sheet and also in contact with a lower oriented polymer sheet, and a positioning adhesive in contact with the lower side of said lower polymer sheet.

22 Claims, 1 Drawing Sheet

Fig 1.

COMPOSITE POSITIONING IMAGING ELEMENT

FIELD OF THE INVENTION

The invention relates to packaging materials. In a preferred form it relates to the use of thermal dye transfer label for the printing of text, graphics, and images applied to a package.

BACKGROUND OF THE INVENTION

Pressure sensitive labels applied are applied to packages to build brand awareness, show the contents of the package, convey a quality message regarding the contents of a package, and supply consumer information such as directions on product use, or an ingredient listing of the contents. Printing on the pressure sensitive label is typically applied directly to the package or a printed media, typically printed using gravure printing or flexography is applied to the package. The three types of information applied to a pressure sensitive label are text, graphic, and images. Some packages only require one type of information, while other packages require more than one type of information.

Prior art labels that are applied to packages consist of a face stock material, a pressure sensitive adhesive, and a liner. The label substrate consisting of the face stock, pressure sensitive adhesive, and liner are typically laminated and then printed utilizing a variety of nonphotographic printing methods. After printing, the labels are generally protected by an over laminate material or a protective coating. The completed label consisting of a protection layer, printed information, face stock, pressure sensitive adhesive, and liner material is applied to packages utilizing high speed labeling equipment.

Flexography is an offset letterpress technique where the printing plates are made from rubber or photopolymers. The printing on pressure sensitive label is accomplished by the transfer of ink from the raised surface of the printing plate to the surface of the material being printed. The rotogravure method of printing uses a print cylinder with thousands of tiny cells which are below the surface of the printing cylinder. The ink is transferred from the cells when the print cylinder is brought into contact with the pressure sensitive label at the impression roll. Printing inks for flexography or rotogravure include solvent based inks, water based inks, and radiation cured inks. While rotogravure and flexography printing does provide acceptable image quality, these two printing methods require expensive and time-consuming preparation of print cylinders or printing plates which make printing jobs of less than 100,000 units expensive as the setup cost and the cost of the cylinders or printing plates is typically depreciated over the size of the print job.

Recently, digital printing has become a viable method for the printing of information on packages. The term "digital printing" refers to the electronic digital characters or electronic digital images that can be printed by an electronic output device capable of translating digital information. The two main digital printing technologies are ink jet and electrophotography.

The introduction of piezo impulse drop-on-demand (DOD) and thermal DOD ink jet printers in the early 1980's provided ink jet printing systems. These early printers were very slow, and the ink jet nozzles often clogged. In the 1990's Hewlett Packard introduced the first monochrome ink jet printer, and, shortly thereafter the introduction of color, wide format ink jet printers enabled businesses to enter the graphic arts market. Today a number of different ink jet technologies are being used for packaging, desktop, industrial, commercial, photographic, and textile applications.

In piezo technology, a piezo crystal is electrically simulated to create pressure waves, which eject ink from the ink chamber. The ink can be electrically charged and deflected in a potential field, allowing the different characters to be created. More recent developments have introduced DOD multiple jets that utilize conductive piezo ceramic material which, when charged, increases the pressure in the channel and forces a drop of ink from the end of the nozzle. This allows for very small droplets of ink to form and be delivered at high speed at very high resolution, approximately 1,000 dpi printing.

Until recently, the use of color pigments in jet inks was uncommon. However, this is changing rapidly. Submicron pigments were developed in Japan for ink jet applications. Use of pigments allows for more temperature resistant inks required for thermal ink jet printers and laminations. Pigmented water-based jet inks are commercially available, and UV-curable jet inks are in development. Pigmented inks have greater lightfastness and water-resistance.

Digital ink jet printing has the potential to revolutionize the printing industry by making short-run, color print jobs more economical. However, the next commercial stage will require significant improvements in ink jet technology; the major hurdle remaining is to improve print speed. Part of this problem is the limitation of the amount of data the printer can handle rapidly. The more complex the design, the slower the printing process. Right now they are about 10 times slower than comparable digital electrostatic printers.

Electrophotography was invented in the 1930's by Chester Carlson. By the early 1970's, the development of an electrophotographic color copier was being investigated by many companies. The technology for producing color copiers was already in place, but the market was not. It would take many more years until customer demand for color copies would create the necessary incentive to develop suitable electrostatic color copiers. By the late 1970's a few companies were using fax machines that could scan a document, reduce the images to electronic signals, send them out over the telephone wire and, using another fax machine, retrieve the electronic signals and print the original image using heat-sensitive papers to produce a printed copy.

In 1993 Indigo and Xeikon introduced commercial digital printing machines targeted on short-run markets that were dominated by sheet-fed lithographic printers. Elimination of intermediate steps associated with negatives and plates used in offset printing provides faster turnaround and better customer service. These digital presses share some of the characteristics of traditional xerography but use very specialized inks. Unlike inks for conventional photocopiers, these inks are made with very small particle size components in the range of 1 $\mu$m. Dry toners used in xerography are typically 8–10 $\mu$m in size.

In 1995 Indigo introduced the Ominus press designed for printing flexible packaging products. The Ominus uses a digital offset color process called One Shot Color that has six colors. A key improvement has been the use of a special white Electro ink for transparent substrates. The Ominus web-fed digital printing system allows printing of various substrates using an offset cylinder that transfers the color image to the substrate. In principle, this allows perfect register regardless of the substrate being printed; paper, film, and metal can be printed by this process. This digital printing system is based on an electrophotographic process where the electrostatic image is created on the surface of a photoconductor by first charging the photoconductor by charge corona and exposing the photoconductive surface to a light source in image fashion.

The charged electrostatic latent image is then developed using ink containing an opposite charge to that on the image. This part of the process is similar to that of electrostatic toners associated with photocopying machines. The latent charged electrostatic image formed on the photoconductor surface is developed by means of electrophoretic transfer of the liquid toner. This electrostatic toner image is then transferred to a hot blanket, which coalesces the toner and maintains it in a tacky state until it is transferred to the substrate, which cools the ink and produces a tack-free print.

Electro inks typically comprise mineral oil and volatile organic compounds. They are designed so that the thermoplastic resin will fuse at elevated temperatures. In the actual printing process, the resin coalesces and the inks are transferred to the substrate. There is no need to heat the ink to dry it. The ink is deposited on the substrate essentially dry, although it becomes tack-free as it cools and reaches room temperature.

For several decades a magnetic digital technology called "magnetography" has been under development. This process involves creating electrical images on a magnetic cylinder and using magnetic toners as inks to create the image. The potential advantage of this technology lies in its high press speed. Tests have shown speeds of 200 meters per minute. Although these magnetic digital printers are limited to black-and-white copy, developments of color magnetic inks would make this high-speed digital technology economically feasible. The key to its growth will be further development of the VHSM (very high speed magnetic) drum and the color magnetic inks.

Within the magnetic digital arena, a hybrid system called magnetolithography has been built and tested on narrow web and short-run applications developed by Nipson Printing Systems in Belfort, France. The technology appears to provide high resolution, and tests have been conducted using a silicon-based, high density, magnetographic head. Much more work is necessary in the ink development to bring this system to a competitive position relative to ink jet or electrophotography. However, the fact that it has high speed printing potential makes it an attractive alternate for packaging applications in which today's ink jet and electrophotography technologies are lagging.

Photographic materials have been known for use as prints for preserving memories for special events such as birthdays and vacations. They also have been utilized for large display materials utilized in advertising. These materials have been known as high quality products that are costly and somewhat delicate, as they would be easily defaced by abrasion, water, or bending. Photographs are traditionally placed in frames, photo albums, and behind protective materials in view of their fragile and delicate nature, as well as their value. They are considered luxury items for the consumers to preserve a record of important events in their lives. They also have been considered as expensive display materials for advertising. In view of their status as luxury items, they have not been utilized in other areas of commerce. In U.S. Pat. No. 6,436,604 (Bourdelais et al.) a silver halide pressure sensitive label is proposed utilizing silver halide imaging layers applied to the surface of an oriented polyolefin base. While the label described in U.S. Pat. No. 6,436,604 is high in quality and provides high quality replication of flesh tones, the wet chemistry used to develop the images makes a silver halide label impractical for converters and end users that do not have the equipment to handle the wet chemistry required for silver halide image processing.

Further, typical label facestock materials comprise oriented polyolefin or polyester sheets. The typical facestock materials also comprise a cavitated layer to provide thickness and stiffness to the label while saving materials. Prior art polyolefin facestock materials are typically low in cost and lower in strength compared to polyester facestock materials which are higher in cost but higher in strength. There remains a need for a dual polymer facestock that combined the polymer properties of both polyolefin and polyester.

Polyolefin films are very useful as protective packaging because they resist tearing and water penetration. However, a significant drawback to their use is the difficulties encountered in writing, with ink, on the film. Typically, polyolefin films have low surface energies which make them nonreceptive to certain inks, particularly water based inks. The water based inks tend to exhibit bad ink wetting properties, in which they fail to form a complete coating on the film; the ink forms into discrete beads, streaks and splotches on the film. Additionally, water based inks tend to dry slowly, smear easily and rub off once dry. These are serious problems particularly when plastic films are used for shipping articles which are often exposed to moisture and rough handling. To overcome these difficulties written matter is usually applied to a paper label which is then attached to the wrapping but this is inconvenient and presents recycling problems because paper recycling is usually incompatible with plastic recycling.

U.S. Pat. No. 4,984,823 (Ishii et al.) discloses a pressure sensitive label having a sublimation transferred image. While the image does have acceptable image quality, the label base comprises cellulose paper or oriented polymer. Both the paper and polymer label bases suffer from low stiffness for high speed label dispensing and the polymer labels are prone to shrinkage at high temperatures in demanding labeling conditions such as automobile engine labeling, labeling of food items that must endure high pasteurization and labeling of items that are exposed to outdoor conditions.

U.S. Pat. Nos. 5,302,574 (Lawerance et al.) and 5,387,571 (Daly et al.) describe thermal dye receiving layers that can achieve thermal printing dye densities of over 0.5 utilizing a mixtures of polyester polymers. The melt extruded polyester dye receiving layer is preferably applied to a cellulose paper base.

PROBLEM TO BE SOLVED BY THE INVENTION

There is a need for pressure sensitive labels for application to packages that are high in quality and, at the same time, economical for short runs. There is a further need for the printing of the labels from digital information files without the need for wet processing chemistry.

SUMMARY OF THE INVENTION

It is an object of the invention to provide higher quality images to packaging materials.

It is a further object to provide high quality label images that have bright and sharp images.

It is another object to provide a label facestock that combined the desirable properties of both polyolefin and polyester.

These and other objects of the invention are accomplished by an imaging member comprising in order an imaging layer, an upper oriented polymer sheet, a laminating adhesive layer in contact with said upper polymer sheet and also in contact with a lower oriented polymer sheet, and a positioning adhesive in contact with the lower side of said lower polymer sheet.

ADVANTAGEOUS EFFECT OF THE INVENTION

The invention provides improved image quality for packaging materials. The invention includes a printing method that can print high quality text, graphic and images from a digital file while providing a facestock that strong and able to be machine applied to packages.

BRIEF DESCRIPTION OF THE DRAWINGS

The FIG. 1 is a cross section of the structure of a thermal dye transfer imaged composite imaging element.

DETAILED DESCRIPTION OF THE INVENTION

The invention has numerous advantages over prior practices in the art. Recently there has been a trend in the marketing of mass consumer items to try to localize the marketing to separately approach smaller groups. These groups may be regional, ethnic, gender, age, or special interest differentiated. In order to approach these different groups, there is a need to provide packaging that is specifically directed to these groups. As discussed above, the traditional packaging materials are generally suited for very long runs of material, and to form shorter runs or to provide rapid changes in packaging is impossible or very expensive. We have found high quality digital printed images such as silver halide and thermal dye transfer materials that are suitable for packaging uses. Further, recently there has become available rapid thermal printing apparatus suitable for short runs of material. The combination of rapid thermal printing and facestock properties from the composite facestock such as flexibility, high strength, and the ability to flex and bend has resulted in materials satisfactory and suitable for packaging.

The invention materials combine the compressible features of voided polyolefin with the strength and opacity of an oriented polyester sheet. The voided polyolefin layers allow for the efficient thermal dye transfer printing of the labels by providing a voided compressible layer. The polyester sheet of the invention provides mechanical and thermal stability to the polyolefin layer creating a robust and durable label facestock. In addition, the composite positioning imaging element allows for the inclusion of security and anti-tamper features to the label to deter thief and grade goods manufacturing.

The utilization of the thin, flexible, and tough composite facestock materials results in a packaging material having many superior properties. The invention materials are capable of having brighter, sharper, and higher color images than anything presently available in packaging. The packaging materials of the invention have a depth of image unsurpassed by existing packaging materials. The packaging materials of the invention may provide a variety of packing materials that are suitable for pressure sensitive labeling of packages such as shampoo bottles, perfume bottles, and film boxes. The packaging materials of the invention, while having the advantage of superior image, are available on thin base materials which are low in cost while providing superior opacity and strength. The packaging materials of the invention, as they may be imaged by digital printing from digital imaging files, have the ability to be formed in short runs and to be rapidly switched from one image to the next without delay.

The imaged label materials of the invention allow packages to be rapidly designed and brought to market. For instance, significant events in sports or entertainment may be practically instantly brought to market as a digital image may be immediately flash exposed onto silver halide pressure sensitive labels and utilized within moments from the time of the event. This is in contrast to typical photogravure or flexographic imaging where lead times for pressure sensitive labels are typically several weeks. Further, the quality of the digitally formed image lends itself to collectable images formed as a part of packaging much better than previous images which were of lower quality and were less desirable for collecting. Finally, the regional customization of images is rapidly possible.

The ability to rapidly change packaging also would find use in the need to provide regional labeling with different languages and marketing themes in different countries. Further, different countries have different legal labeling requirements as to content. For instance, alcoholic beverages such as wine and beer are subject to a wide variety of regional and national variations in labeling requirements. Wines manufactured in France may have long delays in shipping out of France due to the wait for national labeling in other countries. High quality digital images also would be particularly desirable for a premium products such as fine wines, perfumes, and chocolates, as they would be of high quality and reflect the high quality of the product in the package.

The invention provides a printing method that is economically viable when printing short runs as the cost of printing plates or printing cylinders are avoided. The use of thermal dye transfer, silver halide or ink jet images applied to a package ensures the highest image quality currently available compared to the common, but lower quality six-color rotogravure printed images. Further, because the yellow, magenta, and cyan layers contained gelatin interlayers, the silver halide images appear to have depth compared to electrophotographic images which appear flat and lifeless. The thermal dye transfer and silver halide layers have also been optimized to accurately replicate flesh tones, providing superior images of people compared to alternate prior art digital imaging technologies. These and other advantages will be apparent from the detailed description below.

The terms as used herein, "top", "upper", "emulsion side", and "face" mean the side or toward the side of a packaging label bearing the imaging layers. The term environmental protection layer means the layer applied to the image bearing layers. The terms "face stock" and "substrate" mean the material to which the imaging layers are applied. The terms "bottom", "lower side", "liner" and "back" mean the side or toward the side of the label or packaging material opposite from the side bearing the image.

"Peelable separation" or "peel strength" or "separation force" is a measure of the amount of force required to separate the silver halide label from the package to which the label has been applied. The peel strength is the amount of force required to separate two surfaces that are held together by internal forces of the photographic label adhesive which consist of valence forces or interlocking action, or both. Peel strength is measured using an Instron gauge and peeling the sample at 180 degrees with a crosshead speed of 1.0 meters/min. The sample width is 5 cm and the distance peeled is 10 cm in length.

In order to provide a label material that is both tough and flexible an imaging member comprising in order an imaging layer, an upper oriented polymer sheet, a laminating adhesive layer in contact with said upper polymer sheet and also in contact with a lower oriented polymer sheet, and a positioning adhesive in contact with the lower side of said lower polymer sheet is preferred. This preferred composite facestock material allows for the variation in material composition, mechanical properties or printing properties between the top oriented polymer sheet and the lower polymer sheet. This preferred difference in materials provides a novel new approach to adding feature to a label facestock or solving problems that exist with prior art materials. For example, it is well known that pressure sensitive polymer labels occasionally suffer from dispensing problems caused by label curl away from the printed side. By selecting the proper combination of materials and pre-curling the structure toward the printed side by providing a residual stress in the top polymer sheet, adhesively adhering the top sheet to the bottom sheet and annealing the composite structure, the printed label of the invention will have a slight desirable curl toward the printed side increasing the efficiency of label dispensing at high speed.

Figure 1:
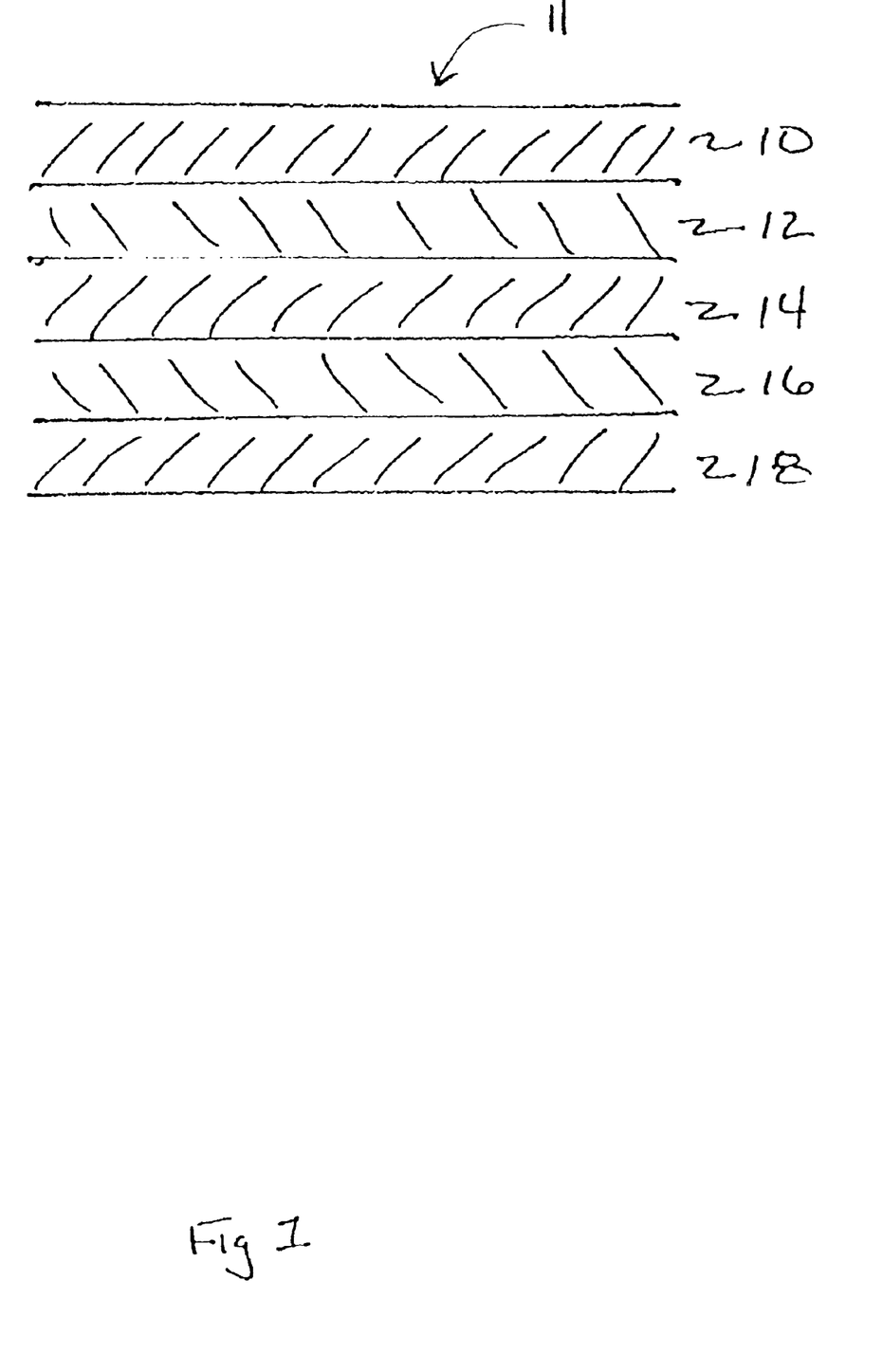

FIG. 1 is a cross section of the structure of a thermal dye transfer imaged composite imaging element 11. Thermal dye transfer imaged layer 10 is on the top most layer of upper oriented polymer sheet 12. Laminating adhesive layer 14 adheres upper oriented polymer sheet 12 to lower polymer sheet 16. Positioning adhesive 18 is provided on the lower most layer of lower oriented polymer sheet 16. The security features of the invention are preferably located between upper oriented polymer sheet 12 and lower oriented polymer sheet 16 to protect the security features from tampering.

In a preferred embodiment of the invention, the peel strength of the adhesive between the upper polymer sheet and the lower polymer sheet is greater than 150 g/5 cm. This peel force insures a permanent bond between the upper polymer sheet and the lower polymer sheet and allows the two polymer sheets to perform as a composite member.

In another preferred embodiment, the adhesive between the upper polymer sheet and the lower polymer sheet comprises a positioning adhesive. A positioning adhesive allows the upper polymer sheet to be removed from the lower polymer sheet so that the upper polymer sheet can be repositioned to a valued added location. An example would be a pressure sensitive label for a medical drug. The upper sheet containing use information could be removed from the lower polymer sheet attached to the drug package and applied to a bathroom mirror as a form of reminder on the dispensing the drug. The positioning adhesive preferably contains polymer spacer beads or wax addition to the base polymer to reduce the peel force of the adhesive and allow for re-positioning. The most preferred positioning adhesive contains at about 5% to 20% by weight of a permanent photographic label adhesive such as isooctyl acrylate/acrylic acid copolymer and at about 95% to 80% by weight of a tacky elastomeric material such as acrylate microspheres with the photographic label adhesive layer coverage at about 5 to 20 g/m². The open time of the adhesive, that is the amount of time that the adhesive system can be repositioned preferably is greater than 2 weeks, most preferably greater than 24 months. A 24 month open time allows for the re-positioning over an extended period and allows for the labeled product to perform in an extended inventory situation where the product might not be sold for over a year.

The positioning adhesive of this invention has a preferred repositioning peel strength between 20 grams/cm and 100 grams/cm. Repositioning peel strength is the amount of force required to peel the imaging element from a stainless steel block at 23° C. and 50% RH. The peel angle is 90°. At repositioning peel strengths less than 15 grams/cm, the positioning adhesive lacks sufficient peel strength to remain adhered to a variety of surfaces such as refrigerators or photo albums. At peel strengths greater than 120 grams/cm, the positioning adhesive of this invention is too aggressive, not allowing the consumer to later reposition the image. The positioning adhesive of this invention may be a single layer or two or more layers. For two or more positioning layers, one of the photographic label adhesive layers preferentially adheres to the lower polymer sheet.

Suitable laminating or positioning photographic label adhesives of this invention must not interact with the imaging systems so that image quality is deteriorated. Further, since photographic elements of this invention must be photoprocessed, the performance of the adhesive of this invention must not be deteriorated by photographic processing chemicals. Suitable adhesive may be inorganic or organic, natural or synthetic, that is capable of bonding the image to the desired surface by surface attachment. Examples of inorganic adhesives are soluble silicates, ceramic and thermosetting powdered glass. Organic adhesives may be natural or synthetic. Examples of natural organic photographic label adhesives include bone glue, soybean starch cellulosics, rubber latex, gums, terpene, mucilages and hydrocarbon resins. Examples of synthetic organic adhesives include elastomer solvents, polysulfide sealants, thermoplastic resins such as isobutylene and polyvinyl acetate, thermosetting resins such as epoxy, phenoformaldehyde, polyvinyl butyral and cyanoacrylates and silicone polymers. Acrylic based adhesives are preferred because acrylic generally does not interfere with the quality of the imaging systems, is low in cost and has the desired performance properties for both the laminating adhesive and the positioning adhesive.

The preferred laminating or positioning adhesive materials may be applied using a variety of methods known in the art to produce thin, consistent photographic label adhesive coatings. Examples include gravure coating, rod coating, reverse roll coating, and hopper coating. The photographic label adhesives may be coated on the liner or the face stock materials prior to lamination.

Upper sheet are preferably polymer because they are tear resistant, have excellent conformability, good chemical resistance and high in strength. Preferred polymer substrates include polyester, oriented polyolefin such as polyethylene and polypropylene, cast polyolefins such as polypropylene and polyethylene, polystyrene, acetate and vinyl. Polymers are preferred as they are strong and flexible and provide an excellent surface for the coating of silver halide imaging layers.

The imaging element where the upper polymer sheet comprises biaxially oriented polyolefin is preferred. Biaxially oriented polyolefin is low in cost and can contain residual strain so that after adhesively adhering to the lower polymer sheet, can be used to provide a curl toward the printed side which improves dispensing efficiency. In a more preferred embodiment of the invention, the upper polymer sheet comprises biaxially oriented polypropylene. Polypropylene is low in cost and has a higher mechanical modulus that polyethylene. In addition, the Tg of polypropylene is higher than polyethylene and therefore improves the temperature stability of the imaging member in labeling application.

In a further embodiment of the invention, the upper polymer sheet comprises voids. The voided layer has been shown to improve the opacity of the imaging element, increase the stiffness of the imaging element and provide a compressible layer to improve the density of thermal dye transfer printed images. The voided layer has been shown to provide a 25% increase in density compared to a solid polymer sheet. By combining a voided polyolefin upper sheet with a polyester lower sheet, the thermally printed imaging element has both high density and high strength. Also, the voided layers of the microvoided biaxially oriented sheets have been shown to significantly reduce pressure sensitivity of the silver halide imaging layers. By Micro-voided biaxially oriented sheets are conveniently manufactured by coextrusion of the core and surface layers, followed by biaxial orientation, whereby voids are formed around void-initiating material contained in the core layer. Such composite sheets are disclosed in U.S. Pat. Nos. 4,377,616; 4,758,462; 4,632,869; and 5,866,282.

"Void" is used herein to mean devoid of added solid and liquid matter, although it is likely the "voids" contain gas. The void-initiating particles which remain in the finished packaging sheet core should be from 0.1 to 10 µm in diameter and preferably round in shape to produce voids of the desired shape and size. The size of the void is also dependent on the degree of orientation in the machine and transverse directions. Ideally, the void would assume a shape which is defined by two opposed and edge contacting concave disks. In other words, the voids tend to have a lens-like or biconvex shape. The voids are oriented so that the two major dimensions are aligned with the machine and transverse directions of the sheet. The Z-direction axis is a minor dimension and is roughly the size of the cross diameter of the voiding particle. The voids generally tend to be closed cells, and thus there is virtually no path open from one side of the voided-core to the other side through which gas or liquid can traverse.

The flexible polymer upper sheet or the polymer lower sheet preferably contains more than one layer. The skin layers of the flexible substrate can be made of the same polymeric materials as listed above for the core matrix. The composite sheet can be made with skin(s) of the same polymeric material as the core matrix, or it can be made with skin(s) of different polymeric composition than the core matrix. For compatibility, an auxiliary layer can be used to promote adhesion of the skin layer to the core. A skin layer located on the uppermost layer of the upper sheet may be used to aid in imaging layer adhesion, printed ink adhesion or provide color to the imaging element. The total thickness of the topmost skin layer of the upper polymer sheet substrate may be between 0.20 µm and 1.5 µm, preferably between 0.5 and 1.0 µm. Below 0.5 µm any inherent nonplanarity in the coextruded skin layer may result in unacceptable color variation. At skin thickness greater than 1.0 µm, there is a reduction in the photographic optical properties such as image resolution. At thickness greater than 1.0 µm, there is also a greater material volume to filter for contamination such as clumps or poor color pigment dispersion.

Addenda may be added to the core matrix and/or to one or more skin layers of the upper or lower polymer sheet. Titanium dioxide is preferred and is used in this invention to improve image sharpness or MTF, opacity, and whiteness. The $TiO_2$ used may be either anatase or rutile type. Further, both anatase and rutile $TiO_2$ may be blended to improve both whiteness and sharpness. Examples of $TiO_2$ that are acceptable for a photographic system are DuPont Chemical Co. R101 rutile $TiO_2$ and DuPont Chemical Co. R104 rutile $TiO_2$. Other pigments known in the art to improve photographic optical responses may also be used in this invention. Examples of other pigments known in the art to improve whiteness are talc, kaolin, $CaCO_3$, $BaSO_4$, ZnO, $TiO_2$, ZnS, and $MgCO_3$. The preferred $TiO_2$ type is anatase, as anatase $TiO_2$ has been found to optimize image whiteness and sharpness with a voided layer.

The imaging member of the invention preferably has a thickness of less than 600 µm. An imaging member thickness greater than 650 µm in thickness offers no significant improvement in either imaging quality or packaging label performance. Further, transport through high speed packaging equipment is difficult at an imaging member thickness greater than 650 µm and stripping the photographic labels utilizing the Bernoulli method is difficult if the thickness of the photographic label exceeds 700 µm. The imaging member of the invention preferably has a stiffness of between 5 and 20 millinewtons. This stiffness range has been shown to provide efficient label dispensing in high speed labeling machines typically used for consumers goods such as soap bottles and wine bottles.

In a further embodiment of the invention, the lower polymer sheet is voided. A lower voided polymer is low in cost, provides improved opacity compared to a solid polymer and can be thermal dye transfer printed with high efficiency. In a most preferred embodiment of the invention, the lower polymer sheet comprises a voided polyester sheet. The voided polyester sheet is high in opacity, has an increased mechanical modulus and temperature resistance compared to polyolefin voided materials. According to the present invention a process useful for the production of a voided lower polymer sheet comprises a blend of particles of a linear polyester with from 10 to 40% by weight of particles of a homopolymer or copolymer of polyolefin, extruding the blend as a film, quenching and biaxially orienting the film by stretching it in mutually perpendicular directions, and heat setting the film. Preferred amount of polyolefin is between 40 and 50% of the total polymer weight of the vacuous layer as this gives a low cost and low density layer. The preferred polyolefin is propylene as it is low in cost and successfully blends with the polyester for extrusion.

The opacity of the resulting voided lower polymer sheet arises through voiding which occurs between the regions of the linear polyester and the polyolefin polymer during the stretching operation. The linear polyester component of the voided lower polymer sheet may consist of any thermoplastic film forming polyester which may be produced by condensing one or more dicarboxylic acids or a lower alkyl diester thereof, e.g. terephthalic acid, isophthalic, phthalic, 2,5-, 2,6- or 2,7-naphthalene dicarboxylic acid, succinic acid, sebacic acid, adipic acid, azelaic acid, bibenzoic acid, and hexahydroterephthalic acid, or bis-p-carboxy phenoxy ethane, with one or more glycols, e.g. ethylene glycol, 1,3-propanediol, 1-4-butanediol, neopentyl glycol and 1,4-cyclohexanedimethanol. It is to be understood that a copolyester of any of the above materials may be used. The preferred polyester is polyethylene terephthalate.

The preferred polyolefin additive which is blended with the polyester is a homopolymer or copolymer of propylene. Generally a homopolymer produces adequate opacity in the vacuous polymer and it is preferred to use homopolypropylene. An amount of 10 to 40% by weight of polyolefin additive, based on the total weight of the blend, is used. Amounts less than 10% by weight do not produce an adequate opacifying effect. Increasing the amount of polyolefin additive causes the tensile properties, such as tensile yield and break strength, modulus and elongation to break, to deteriorate and it has been found that amounts generally exceeding about 40% by weight can lead to film splitting during production. Satisfactory opacifying and tensile properties can be obtained with up to 35% by weight of polyolefin additive.

The polyolefin additive used according to this invention is incompatible with the polyester component of the vacuous polymer base and exists in the form of discrete globules dispersed throughout the oriented and heat set vacuous polymer base. The opacity of the vacuous polymer base is produced by voiding which occurs between the additive globules and the polyester when the vacuous polymer base is stretched. It has been discovered that the polymeric additive must be blended with the linear polyester prior to extrusion through the film forming die by a process which results in a loosely blended mixture and does not develop an intimate bond between the polyester and the polyolefin additive.

Such a blending operation preserves the incompatibility of the components and leads to voiding when the vacuous polymer base is stretched. A process of dry blending the polyester and polyolefin additive has been found to be useful. For instance, blending may be accomplished by mixing finely divided, e.g. powdered or granular, polyester and polymeric additive and, thoroughly mixing them together, e.g. by tumbling them. The resulting mixture is then fed to the film forming extruder. Blended polyester and polymeric additive which has been extruded and, e.g. reduced to a granulated form, can be successfully re-extruded into a vacuous opaque voided film (vacuous polymer base). It is thus possible to re-feed scrap film, e.g. as edge trimmings, through the process. Alternatively, blending may be effected by combining melt streams of polyester and the polyolefin additive just prior to extrusion. If the polymeric additive is added to the polymerization vessel in which the linear polyester is produced, it has been found that voiding and hence opacity is not developed during stretching. This is thought to be on account of some form of chemical or physical bonding which may arise between the additive and polyester during thermal processing.

The extrusion, quenching and stretching of the voided lower polymer sheet may be effected by any process which is known in the art for producing oriented polyester film, e.g. by a flat film process or a bubble or tubular process. The flat film process is preferred for making vacuous polymer base according to this invention and involves extruding the blend through a slit die and rapidly quenching the extruded web upon a chilled casting drum so that the polyester component of the film is quenched into the amorphous state. The film base is then biaxially oriented by stretching in mutually perpendicular directions at a temperature above the glass-rubber transition temperature of the polyester. Generally the film is stretched in one direction first and then in the second direction although stretching may be effected in both directions simultaneously if desired. In a typical process the film is stretched firstly in the direction of extrusion over a set of rotating rollers or between two pairs of nip rollers and is then stretched in the direction transverse thereto by means of a tenter apparatus. The film may be stretched in each direction to 2.5 to 4.5 times its original dimension in the direction of stretching. After the film has been stretched and a vacuous polymer base formed, it is heat set by heating to a temperature sufficient to crystallize the polyester whilst restraining the vacuous polymer base against retraction in both directions of stretching. The voiding tends to collapse as the heat setting temperature is increased and the degree of collapse increases as the temperature increases. Hence the light transmission increases with an increase in heat setting temperatures. Whilst heat setting temperatures up to about 230 C. can be used without destroying the voids, temperatures below 200 C. generally result in a greater degree of voiding and higher opacity.

The opacity as determined by the total luminous transmission of a voided lower polymer sheet depends upon the thickness of the voided lower polymer sheet. Thus the stretched and heat set voided lower polymer sheet made according to this invention have a total luminous transmission not exceeding 25%, preferably not exceeding 20%, for vacuous polymer base having a thickness of at least 100 micrometers, when measured by ASTM test method D-1003-61. Voided lower polymer sheet of thickness 50 to 99 micrometers have a total luminous transmission generally up to 30%. The invention also therefore relates to opaque biaxially oriented and heat set vacuous polymer bases produced from a blend of a linear polyester and from 10 to 40% by weight of a homopolymer or copolymer of ethylene or propylene and having a total luminous transmission of up to 30%. Such vacuous polymer bases may be made by the process specified above. The globules of polymeric additive distributed throughout the film produced according to this invention are generally 5 to 50 micrometer in diameter and the voids surrounding the globules 3 to 4 times the actual diameter of the globules. It has been found that the voiding tends to collapse when the void size is of the order of the vacuous polymer base thickness. Such vacuous polymer base therefore tends to exhibit poor opacity because of the smaller number of void surfaces at which light scattering can occur. Accordingly it is therefore preferred that the voided lower polymer sheet of this invention should have a thickness of at least 25 microns. voided lower polymer sheet thickness of between 100 and 250 micrometers are convenient for most end uses. Because of the voiding, the voided lower polymer sheet with a density of less than 0.7 gm/cc lighter in weight, and more resilient than those bases with higher densities. The voided lower polymer sheet may contain any compatible additive, such as pigments. Thus a light reflecting pigment, such as titanium dioxide, may be incorporated to improve the appearance and whiteness of the voided lower polymer sheet.

In another preferred embodiment of the invention antistatic material are incorporated into the laminating adhesive layers. The antistatic material incorporated into the laminating adhesive layer provides static protection to the silver halide layers and reduces the static on the label which has been shown to aid labeling of containers in high speed labeling equipment. As a stand-alone or supplement to the liner comprising an antistatic layer, the laminating adhesive may also further comprise an antistatic agent selected from the group consisting of conductive metal oxides, carbon particles, and synthetic smectite clay, or multilayered with an inherently conductive polymer. In one of the preferred embodiments, the antistat material is metal oxides. Metal oxides are preferred because they are readily dispersed in the thermoplastic adhesive and can be applied to the polymer sheet by any means known in the art. Conductive metal oxides that may be useful in this invention are selected from the group consisting of conductive particles including doped-metal oxides, metal oxides containing oxygen deficiencies, metal antimonates, conductive nitrides, carbides, or borides, for example, $TiO_2$, $SnO_2$, $Al_2O_3$, $ZrO_3$, $In_2O_3$, $MgO$, $ZnSb_2O_6$, $InSbO_4$, $TiB_2$, $ZrB_2$, $NbB_2$, $TaB_2$, $CrB_2$, $MoB$, $WB$, $LaB_6$, $ZrN$, $TiN$, $TiC$, and $WC$. The most preferred materials are tin oxide and vanadium pentoxide because they provide excellent conductivity and are transparent.

In another preferred embodiment of the invention, the imaging element further comprises a security feature located between the upper and lower polymer features. By locating a security feature between the upper and lower polymers sheets the security feature is protected during the image formation process and tamper resistant in that the imaging element would need to be destroyed to tamper wit the security feature. In another preferred embodiment, the security feature is located between the laminating adhesive and the lower polymer sheet. By locating the security feature between the laminating adhesive and the lower polymer sheet, the feature is further protected by the laminating adhesive.

Preferred security features include, infra-red inks, ultra-violet inks, fluorescent inks, magnetic layers, metallic layers that form changes in capacitance, printed patterns both visible and invisible, colored dots, holographic designs and images.

The following is an example of a preferred opaque, thermal dye transfer label structure that has an environmental protection layer (EPL) applied to the thermal dye transfer image.

7.5 μm ground styrene butyl acrylate fused EPL

Thermal dye transfer image

Voided polypropylene sheet with 12% $TiO_2$ and density of 0.74 g/cc

Acrylic laminating adhesive

Voided polyester with a density if 0.70 g/cc

Acrylic pressure sensitive adhesive

Cellulose paper peelable back

Used herein, the phrase 'imaging element' comprises an imaging support comprising the upper polymer sheet and the lower polymer sheet as described above, along with an image receiving layer as applicable to multiple techniques governing the transfer of an image onto the imaging element. Such techniques include thermal dye transfer, electrophotographic printing, or ink jet printing, as well as a support for photographic silver halide images. As used herein, the phrase "photographic element" is a material that utilizes photosensitive silver halide in the formation of images.

The thermal dye image-receiving layer of the receiving elements of the invention may comprise polymers or mixtures of polymers that provide sufficient dye density, printing efficiency and high quality images. For example, polycarbonate, polyurethane, polyester, polyvinyl chloride, poly(styrene-co-acrylonitrile), poly(caprolactone), polylatic acid, saturated polyester resins, polyacrylate resins, poly (vinyl chloride-co-vinylidene chloride), chlorinated polypropylene, poly(vinyl chloride-co-vinyl acetate), poly (vinyl chloride-co-vinyl acetate-co-maleic anhydride), ethyl cellulose, nitrocellulose, poly(acrylic acid) esters, linseed oil-modified alkyd resins, rosin-modified alkyd resins, phenol-modified alkyd resins, phenolic resins, maleic acid resins, vinyl polymers, such as polystyrene and polyvinyltoluene or copolymer of vinyl polymers with methacrylates or acrylates, poly(tetrafluoroethylene-hexafluoropropylene), low-molecular weight polyethylene, phenol-modified pentaerythritol esters, poly(styrene-co-indene-co-acrylonitrile), poly(styrene-co-indene), poly(styrene-co-acrylonitrile), poly(styrene-co-butadiene), poly(stearyl methacrylate) blended with poly(methyl methacrylate). Among them, a mixture of a polyester resin and a vinyl chloridevinyl acetate copolymer is preferred, with the mixing ratio of the polyester resin and the vinyl chloride-vinyl acetate copolymer being preferably 50 to 200 parts by weight per 100 parts by weight of the polyester resin. By use of a mixture of a polyester resin and a vinyl chloride-vinyl acetate copolymer, light resistance of the image formed by transfer on the image-receiving layer can be improved.

The dye image-receiving layer may be present in any amount that is effective for the intended purpose. In general, good results have been obtained at a concentration of from about 1 to about 10 $g/m^2$. An overcoat layer may be further coated over the dye-receiving layer, such as described in U.S. Pat. No. 4,775,657 of Harrison et al.

In another embodiment of the invention, the thermal dye receiving layer comprises a polyester. Polyesters are low in cost and have good strength and surface properties. Polyesters have high optical transmission values that allow for high light transmission and diffusion. This high light transmission and diffusion allows for greater differences in the bright and dark projected areas increasing contrast. In a preferred embodiment of the invention, the polyesters have a number molecular weight of from about 5,000 to about 250,000 more preferably from 10,000 to 100,000.

The polymers used in the dye-receiving elements of the invention are condensation type polyesters based upon recurring units derived from alicyclic dibasic acids (Q) and diols (L) wherein (Q) represents one or more alicyclic ring containing dicarboxylic acid units with each carboxyl group within two carbon atoms of (preferably immediately adjacent) the alicyclic ring and (L) represents one or more diol units each containing at least one aromatic ring not immediately adjacent to (preferably from 1 to about 4 carbon atoms away from) each hydroxyl group or an alicyclic ring which may be adjacent to the hydroxyl groups. For the purposes of this invention, the terms "dibasic acid derived units" and "dicarboxylic acid derived units" are intended to define units derived not only from carboxylic acids themselves, but also from equivalents thereof such as acid chlorides, acid anhydrides and esters, as in each case the same recurring units are obtained in the resulting polymer. Each alicyclic ring of the corresponding dibasic acids may also be optionally substituted, e.g. with one or more C1 to C4 alkyl groups. Each of the diols may also optionally be substituted on the aromatic or alicyclic ring, e.g. by C1 to C6 alkyl, alkoxy, or halogen.

In another embodiment of the invention, the polymer layer comprises a polycarbonate. The diffusion elements formed out of polycarbonate are easily melted to form areas of specular and diffuse transmission. Polycarbonates have high optical transmission values that allow for high light transmission and diffusion. This high light transmission and diffusion allows for greater differences in the bright and dark projected areas increasing contrast.

Polycarbonates (the term "polycarbonate" as used herein means a carbonic acid and a diol or diphenol) and polyesters have been suggested for use in image-receiving layers. Polycarbonates (such as those disclosed in U.S. Pat. Nos. 4,740,497 and 4,927,803) have been found to possess good dye uptake properties and desirable low fade properties when used for thermal dye transfer. As set forth in U.S. Pat. No. 4,695,286, bisphenol-A polycarbonates of number average molecular weights of at least about 25,000 have been found to be especially desirable in that they also minimize surface deformation that may occur during thermal printing.

Polyesters, on the other hand, can be readily synthesized and processed by melt condensation using no solvents and relatively innocuous chemical starting materials. Polyesters formed from aromatic diesters (such as disclosed in U.S. Pat. No. 4,897,377) generally have good dye up-take properties when used for thermal dye transfer. Polyesters formed from alicyclic diesters disclosed in U.S. Pat. No. 5,387,571 (Daly et al.) and polyester and polycarbonate blends disclosed in U.S. Pat. No. 5,302,574 (Lawrence et al.), the disclosure of which is incorporated by reference.

Polymers may be blended for use in the dye-receiving layer in order to obtain the advantages of the individual polymers and optimize the combined effects. For example, relatively inexpensive unmodified bisphenol-A polycarbonates of the type described in U.S. Pat. No. 4,695,286 may be blended with the modified polycarbonates of the type described in U.S. Pat. No. 4,927,803 in order to obtain a receiving layer of intermediate cost having both improved resistance to surface deformation which may occur during thermal printing and to light fading which may occur after printing. A problem with such polymer blends, however, results if the polymers are not completely miscible with each other, as such blends may exhibit a certain amount of haze. While haze is generally undesirable, it is especially detrimental for transparent labels. Blends that are not completely compatible may also result in variable dye uptake, poorer image stability, and variable sticking to dye donors.

In a preferred embodiment of the invention, the alicyclic rings of the dicarboxylic acid derived units and diol derived units contain from 4 to 10 ring carbon atoms. In a particularly preferred embodiment, the alicyclic rings contain 6 ring carbon atoms.

A dye-receiving element for thermal dye transfer comprising a miscible blend of an unmodified bisphenol-A polycarbonate having a number molecular weight of at least about 25,000 and a polyester comprising recurring dibasic acid derived units and diol derived units, at least 50 mole % of the dibasic acid derived units comprising dicarboxylic acid derived units containing an alicyclic ring within two carbon atoms of each carboxyl group of the corresponding dicarboxylic acid, and at least 30 mole % of the diol derived units containing an aromatic ring not immediately adjacent to each hydroxyl group of the corresponding diol or an alicyclic ring are preferred. This polymer blend has excellent dye uptake and image dye stability, and which is essentially free from haze. It provides a receiver having improved fingerprint resistance and retransfer resistance, and can be effectively printed in a thermal printer with significantly reduced thermal head pressures and printing line times. Surprisingly, these alicyclic polyesters were found to be compatible with high molecular weight polycarbonates.

Examples of unmodified bisphenol-A polycarbonates having a number molecular weight of at least about 25,000 include those disclosed in U.S. Pat. No. 4,695,286. Specific examples include Makrolon 5700 (Bayer AG) and LEXAN 141 (General Electric Co.) polycarbonates.

In a further preferred embodiment of the invention, the unmodified bisphenol-A polycarbonate and the polyester polymers are blended at a weight ratio to produce the desired Tg of the final blend and to minimize cost. Conveniently, the polycarbonate and polyester polymers may be blended at a weight ratio of from about 75:25 to 25:75, more preferably from about 60:40 to about 40:60.

Among the necessary features of the polyesters for the blends of the invention is that they do not contain an aromatic diester such as terephthalate, and that they be compatible with the polycarbonate at the composition mixtures of interest. The polyester preferably has a Tg of from about 40 C to about 100 C, and the polycarbonate a Tg of from about 100 C to about 200 C. The polyester preferably has a lower Tg than the polycarbonate, and acts as a polymeric plasticizer for the polycarbonate. The Tg of the final polyester/polycarbonate blend is preferably between 40 C and 100 C. Higher Tg polyester and polycarbonate polymers may be useful with added plasticizer. Preferably, lubricants and/or surfactants are added to the dye receiving layer for easier processing and printing. The lubricants can help in polymer extrusion, casting roll release, and printability. Preferably, the polyester dye receiving layer is melt extruded on the outer most surface of the upper polymer sheet.

Dye-donor elements that are used with the dye-receiving element of the invention conventionally comprise a support having thereon a dye containing layer. Any dye can be used in the dye-donor employed in the invention, provided it is transferable to the dye-receiving layer by the action of heat. Especially good results have been obtained with sublimable dyes. Dye donors applicable for use in the present invention are described, e.g., in U.S. Pat. Nos. 4,916,112; 4,927,803; and 5,023,228. As noted above, dye-donor elements are used to form a dye transfer image. Such a process comprises image-wise-heating a dye-donor element and transferring a dye image to a dye-receiving element as described above to form the dye transfer image. In a preferred embodiment of the thermal dye transfer method of printing, a dye donor element is employed which compromises a poly(ethylene terephthalate) support coated with sequential repeating areas of cyan, magenta, and yellow dye, and the dye transfer steps are sequentially performed for each color to obtain a three-color dye transfer image. When the process is only performed for a single color, then a monochrome dye transfer image is obtained.

Thermal printing heads, which can be used to transfer dye from dye-donor elements to receiving elements of the invention, are available commercially. There can be employed, for example, a Fujitsu Thermal Head (FTP-040 MCS001), a TDK Thermal Head F415 HH7-1089, or a Rohm Thermal Head KE 2008-F3. Alternatively, other known sources of energy for thermal dye transfer may be used, such as lasers as described in, for example, GB No. 2,083,726A.

A thermal dye transfer assemblage of the invention comprises (a) a dye-donor element, and (b) a dye-receiving element as described above, the dye-receiving element being in a superposed relationship with the dye-donor element so that the dye layer of the donor element is in contact with the dye image-receiving layer of the receiving element.

When a three-color image is to be obtained, the above assemblage is formed on three occasions during the time when heat is applied by the thermal printing head. After the first dye is transferred, the elements are peeled apart. A second dye-donor element (or another area of the donor element with a different dye area) is then brought in register with the dye-receiving element and the process repeated. The third color is obtained in the same manner.

The electrographic and electrophotographic processes and their individual steps have been well described in the prior art. The processes incorporate the basic steps of creating an electrostatic image, developing that image with charged, colored particles (toner), optionally transferring the resulting developed image to a secondary substrate, and fixing the image to the substrate. There are numerous variations in these processes and basic steps; the use of liquid toners in place of dry toners is simply one of those variations.

The first basic step, creation of an electrostatic image, can be accomplished by a variety of methods. The electrophotographic process of copiers uses imagewise photodischarge, through analog or digital exposure, of a uniformly charged photoconductor. The photoconductor may be a single-use system, or it may be rechargeable and reimageable, like those based on selenium or organic photoreceptors.

In one form, the electrophotographic process of copiers uses imagewise photodischarge, through analog or digital exposure, of a uniformly charged photoconductor. The photoconductor may be a single-use system, or it may be rechargeable and reimageable, like those based on selenium or organic photoreceptors.

In an alternate electrographic process, electrostatic images are created ionographically. The latent image is created on dielectric (charge-holding) medium, either paper or film. Voltage is applied to selected metal styli or writing nibs from an array of styli spaced across the width of the medium, causing a dielectric breakdown of the air between the selected styli and the medium. Ions are created, which form the latent image on the medium.

Electrostatic images, however generated, are developed with oppositely charged toner particles. For development with liquid toners, the liquid developer is brought into direct contact with the electrostatic image. Usually a flowing liquid is employed, to ensure that sufficient toner particles are available for development. The field created by the electrostatic image causes the charged particles, suspended in a nonconductive liquid, to move by electrophoresis. The charge of the latent electrostatic image is thus neutralized by the oppositely charged particles. The theory and physics of electrophoretic development with liquid toners are well described in many books and publications.

If a reimageable photoreceptor or an electrographic master is used, the toned image is transferred to paper (or other substrate). The paper is charged electrostatically, with the polarity chosen to cause the toner particles to transfer to the paper. Finally, the toned image is fixed to the paper. For self-fixing toners, residual liquid is removed from the paper by air-drying or heating. Upon evaporation of the solvent, these toners form a film bonded to the paper. For heat-fusible toners, thermoplastic polymers are used as part of the particle. Heating both removes residual liquid and fixes the toner to paper.

When used as ink jet imaging media, the recording elements or media typically comprise a substrate or a support material having on at least one surface thereof an ink-receiving or image-forming layer. If desired, in order to improve the adhesion of the ink receiving layer to the support, the surface of the support may be corona-discharge-treated prior to applying the solvent-absorbing layer to the support or, alternatively, an undercoating, such as a layer formed from a halogenated phenol or a partially hydrolyzed vinyl chloride-vinyl acetate copolymer, can be applied to the surface of the support. The ink receiving layer is preferably coated onto the support layer from water or water-alcohol solutions at a dry thickness ranging from 3 to 75 micrometers, preferably 8 to 50 micrometers.

Any known ink jet receiver layer can be used in combination with the external polyester-based barrier layer of the present invention. For example, the ink receiving layer may consist primarily of inorganic oxide particles such as silicas, modified silicas, clays, aluminas, fusible beads such as beads comprised of thermoplastic or thermosetting polymers, non-fusible organic beads, or hydrophilic polymers such as naturally-occurring hydrophilic colloids and gums such as gelatin, albumin, guar, xantham, acacia, chitosan, starches and their derivatives, and the like; derivatives of natural polymers such as functionalized proteins, functionalized gums and starches, and cellulose ethers and their derivatives; and synthetic polymers such as polyvinyloxazoline, polyvinylmethyloxazoline, polyoxides, polyethers, poly(ethylene imine), poly(acrylic acid), poly (methacrylic acid), n-vinyl amides including polyacrylamide and polyvinylpyrrolidone, and poly(vinyl alcohol), its derivatives and copolymers; and combinations of these materials. Hydrophilic polymers, inorganic oxide particles, and organic beads may be present in one or more layers on the substrate and in various combinations within a layer.

A porous structure may be introduced into ink receiving layers comprised of hydrophilic polymers by the addition of ceramic or hard polymeric particulates, by foaming or blowing during coating, or by inducing phase separation in the layer through introduction of non-solvent. In general, it is preferred for the base layer to be hydrophilic, but not porous. This is especially true for photographic quality prints, in which porosity may cause a loss in gloss. In particular, the ink receiving layer may consist of any hydrophilic polymer or combination of polymers with or without additives as is well known in the art.

If desired, the ink receiving layer can be overcoated with an ink-permeable, anti-tack protective layer, such as, for example, a layer comprising a cellulose derivative or a cationically-modified cellulose derivative or mixtures thereof. An especially preferred overcoat is poly β-1,4-anhydro-glucose-g-oxyethylene-g-(2'-hydroxypropyl)-N,N-dimethyl-N-dodecylammonium chloride. The overcoat layer is non porous, but is ink permeable and serves to improve the optical density of the images printed on the element with water-based inks. The overcoat layer can also protect the ink receiving layer from abrasion, smudging, and water damage. In general, this overcoat layer may be present at a dry thickness of about 0.1 to about 5 $\mu$m, preferably about 0.25 to about 3 $\mu$m.

In practice, various additives may be employed in the ink receiving layer and overcoat. These additives include surface active agents such as surfactant(s) to improve coatability and to adjust the surface tension of the dried coating, acid or base to control the pH, antistatic agents, suspending agents, antioxidants, hardening agents to cross-link the coating, antioxidants, UV stabilizers, light stabilizers, and the like. In addition, a mordant may be added in small quantities (2%–10% by weight of the base layer) to improve waterfastness. Useful mordants are disclosed in U.S. Pat. No. 5,474,843.

The layers described above, including the ink receiving layer and the overcoat layer, may be coated by conventional coating means onto a transparent or opaque support material commonly used in this art. Coating methods may include, but are not limited to, blade coating, wound wire rod coating, slot coating, slide hopper coating, gravure, curtain coating, and the like. Some of these methods allow for simultaneous coatings of both layers, which is preferred from a manufacturing economic perspective.

The DRL (dye receiving layer) is coated over the tie layer or TL at a thickness ranging from 0.1–10 $\mu$m, preferably 0.5–5 $\mu$m. There are many known formulations which may be useful as dye receiving layers. The primary requirement is that the DRL is compatible with the inks with which it will be imaged so as to yield the desirable color gamut and density. As the ink drops pass through the DRL, the dyes are retained or mordanted in the DRL, while the ink solvents pass freely through the DRL and are rapidly absorbed by the TL. Additionally, the DRL formulation is preferably coated from water, exhibits adequate adhesion to the TL, and allows for easy control of the surface gloss.

For example, Misuda et al in U.S. Pat. Nos. 4,879,166; 5,264,275; 5,104,730; 4,879,166, and Japanese Patents 1,095,091; 2,276,671; 2,276,670; 4,267,180; 5,024,335; and 5,016,517 disclose aqueous based DRL formulations comprising mixtures of psuedo-bohemite and certain water soluble resins. Light in U.S. Pat. Nos. 4,903,040; 4,930,041; 5,084,338; 5,126,194; 5,126,195; and 5,147,717 disclose aqueous-based DRL formulations comprising mixtures of vinyl pyrrolidone polymers and certain water-dispersible and/or water-soluble polyesters, along with other polymers and addenda. Butters et al in U.S. Pat. Nos. 4,857,386 and 5,102,717 disclose ink-absorbent resin layers comprising mixtures of vinyl pyrrolidone polymers and acrylic or methacrylic polymers. Sato et al in U.S. Pat. No. 5,194,317 and Higuma et al in U.S. Pat. No. 5,059,983 disclose aqueous-coatable DRL formulations based on poly(vinyl alcohol). Iqbal in U.S. Pat. No. 5,208,092 discloses water-based IRL formulations comprising vinyl copolymers which are subsequently cross-linked. In addition to these examples, there may be other known or contemplated DRL formulations which are consistent with the aforementioned primary and secondary requirements of the DRL, all of which fall under the spirit and scope of the current invention.

The preferred DRL is 0.1–10 micrometers thick and is coated as an aqueous dispersion of 5 parts alumoxane and 5 parts poly(vinyl pyrrolidone). The DRL may also contain varying levels and sizes of matting agents for the purpose of controlling gloss, friction, and/or fingerprint resistance, surfactants to enhance surface uniformity and to adjust the surface tension of the dried coating, mordanting agents, antioxidants, UV absorbing compounds, light stabilizers, and the like.

Although the ink-receiving elements as described above can be successfully used to achieve the objectives of the present invention, it may be desirable to overcoat the DRL for the purpose of enhancing the durability of the imaged element. Such overcoats may be applied to the DRL either before or after the element is imaged. For example, the DRL can be overcoated with an ink-permeable layer through which inks freely pass. Layers of this type are described in U.S. Pat. Nos. 4,686,118; 5,027,131; and 5,102,717. Alternatively, an overcoat may be added after the element is imaged. Any of the known laminating films and equipment may be used for this purpose. The inks used in the aforementioned imaging process are well known, and the ink formulations are often closely tied to the specific processes, i.e., continuous, piezoelectric, or thermal. Therefore, depending on the specific ink process, the inks may contain widely differing amounts and combinations of solvents, colorants, preservatives, surfactants, humectants, and the like. Inks preferred for use in combination with the image recording elements of the present invention are water-based, such as those currently sold for use in the Hewlett-Packard Desk Writer 560 C printer. However, it is intended that alternative embodiments of the image-recording elements as described above, which may be formulated for use with inks which are specific to a given ink-recording process or to a given commercial vendor, fall within the scope of the present invention.

Smooth opaque bases are useful in combination with silver halide images because the contrast range of the silver halide image is improved and show through of ambient light during image viewing is reduced. The photographic element of this invention is directed to a silver halide photographic element capable of excellent performance when exposed by either an electronic printing method or a conventional optical printing method. An electronic printing method comprises subjecting a radiation sensitive silver halide emulsion layer of a recording element to actinic radiation of at least $10^{-4}$ ergs/cm$^2$ for up to 100$\mu$ seconds duration in a pixel-by-pixel mode wherein the silver halide emulsion layer is comprised of silver halide grains is also suitable. A conventional optical printing method comprises subjecting a radiation sensitive silver halide emulsion layer of a recording element to actinic radiation of at least $10^{-4}$ ergs/cm$^2$ for $10^{-3}$ to 300 seconds in an imagewise mode wherein the silver halide emulsion layer is comprised of silver halide grains as described above. This invention in a preferred embodiment utilizes a radiation-sensitive emulsion comprised of silver halide grains (a) containing greater than 50 mole percent chloride based on silver, (b) having greater than 50 percent of their surface area provided by {100} crystal faces, and (c) having a central portion accounting for from 95 to 99 percent of total silver and containing two dopants selected to satisfy each of the following class requirements: (i) a hexacoordination metal complex which satisfies the formula:

$$[ML_6]^n \quad (1)$$

wherein n is zero, −1, −2, −3, or −4; M is a filled frontier orbital polyvalent metal ion, other than iridium; and L$_6$ represents bridging ligands which can be independently selected, provided that at least four of the ligands are anionic ligands, and at least one of the ligands is a cyano ligand or a ligand more electronegative than a cyano ligand; and (ii) an iridium coordination complex containing a thiazole or substituted thiazole ligand. Preferred photographic imaging layer structures are described in EP Publication 1 048 977. The photosensitive imaging layers described therein provide particularly desirable images on the base of this invention.

The invention has been described in detail with particular reference to certain preferred embodiments thereof, but it will be understood that variations and modifications can be effected within the spirit and scope of the invention.

EXAMPLES

Example 1

In this example a thermal dye transfer pressure sensitive packaging label was created by applying a thermal dye transfer layers to the composite positioning element of the invention. The composite positioning element consisted of a flexible white biaxially oriented polypropylene sheet laminated to both 25 and 50 micrometer sheets of white pigmented polyester. The composite positioning element was backside coated with a pressure sensitive adhesive that was adhesive laminated to a laminated silicone coated paper liner. A control material consisting of a typical 70 micrometer voided polypropylene label facestock was used. This example will demonstrate many of the advantages of a composite positioning element and will compare the advantages of the 25 and 50 micrometer lower sheet.

Biaxially Oriented Polyolefin Upper Sheet:

A composite sheet polyolefin sheet (70 $\mu$m thick) (d=0.68 g/cc) consisting of a microvoided and oriented polypropylene core (approximately 60% of the total sheet thickness), with a homopolymer non-microvoided oriented polypropylene layer on each side of the voided layer; the void initiating material used was poly(butylene terephthalate). The polyolefin sheet had a skin layer consisting of polyethylene. The polypropylene layer adjacent the voided layer contained 8% rutile TiO$_2$. The silver halide imaging layers were applied to the blue tinted polyethylene skin layer.

Biaxially Oriented Polyester Lower Sheet:

A single layer of both 25 and 50 micrometer polyester pigmented with 8% by weight anatase form of $TiO_2$.

Laminating Adhesive:

Permanent solvent based acrylic adhesive 18 μm thick.

Positioning Adhesive:

Permanent solvent based adhesive 24 micrometers thick.

Paper Liner:

A laminated paper liner that consisted of a cellulose paper core (80 micrometers thick) on to which a biaxially oriented sheet of polypropylene was extrusion laminated to the backside utilizing LDPE resin. The backside oriented polypropylene contained a roughness layer to allow for efficient transport in photographic printing equipment. The roughness layer consisted of a mixture of polyethylene and polypropylene immiscible polymers. The topside of the liner was extrusion coated with LDPE for a silicone hold out. The cellulose paper contained 8% moisture and 1% salt for conductivity. The total thickness of the laminated paper liner was 128 micrometers, and the stiffness was 80 millinewtons in both the machine and cross directions. The paper liner was coated with a silicone release coat adjacent to the extruded LDPE layer.

Structure of the composite imaging element base of the example is as follows:

- Voided polypropylene sheet
- Acrylic pressure sensitive adhesive
- Biaxially oriented polyester sheet
- Acrylic adhesive
- Silicone coating
- Laminated paper liner A typical polycarbonate dye image-receiving layer was applied to the surface of the polyethylene skin layer at a coverage of 2.7 g/m². The imaging element was printed utilizing a Kodak 8670 PS Thermal Dye Transfer Printer. Several test images that contained graphics, text, and images were printed on the invention materials. At this point, the thermal dye transfer images were formed on the composite support. To further improve the durability of the developed image layers, an environmental protection layer was applied to the thermal dye transfer images.

The environmental protection layer was prepared using 7.5 μm ground polymer particles (styrene butyl acrylate available from Hercules as Piccotoner 1221), a soft latex binder (copolymer of butyl acrylate, 2-acrylamido-2-methylpropanesulfonate, and acetoacetoxyethylmethacrylate) as a 20% suspension, a hydrophilic thickening agent (Keltrol T) as a 1% solution, and a surfactant (Olin 10 G) as a 10% solution. The melt was hand-coated using a 3 mil coating knife to form a 547 mg/ft² gelatin pad hardened with bisvinylsulfonyl-methylether at 2.43%. After spreading, the coatings were dried at 30° C.

The above thermal dye transfer images were die cut and machine applied to several polymer bottles typically utilized in the health and beauty industry to simulate application of the label to a package.

The composite imaging elements of the invention and a prior art ink printed polypropylene label with an acrylic adhesive were measured for thickness, stiffness and mechanical modulus and the results are listed in Table 1 below. The bending stiffness of the polyester base and the laminated display material support were measured by using the Lorentzen and Wettre stiffness tester, Model 16D. The output from this instrument is force, in millinewtons, required to bend the cantilevered, unclasped end of a sample 20 mm long and 38.1 mm wide at an angle of 15 degrees from the unloaded position. In this test the stiffness in the machine direction.

TABLE 1

| | Thickness (micrometers) | Modulus (MPa) | Stiffness (mN) |
|---|---|---|---|
| 25 micrometer polyester | 105 | 5700 | 11 |
| 50 micrometer polyester | 126 | 8700 | 16 |
| Prior art | 92 | 2373 | 8 |

As the data in Table 1 indicates, the composite imaging member of the invention showed significantly improved mechanical properties compared to prior art label sheets. By combining the voided polypropylene with the pigmented adhesive the mechanical modulus and stiffness of the invention materials was significantly improved compared to prior art label sheets. Further, the composite imaging member also has better temperature stability as the polyester lower sheet has a Tg higher than the prior art materials. At 100 degrees C., the prior art label sheet showed a 1.5% shrink in the machine direction while the invention materials with both the 25 and 50 micrometer polyester lower sheet experienced a 0.1% shrink in the machine direction. The improved mechanical properties of the invention materials compared to the control materials have utility for demanding labeling applications such as automotive, display applications that use high intensity light, outdoor labeling applications and containers that are sterilized before filling.

The voided polypropylene upper sheet provided compression during the thermal dye transfer process that utilized both heat and pressure to transfer dyes from a doner web to the composite base. The voided layer of the invention provided a significant improvement in density (2.6 Dmax compared to Dmax of 1.3 when the thermal dye transfer images is applied to a solid polymer sheet).

The composite imaging element of the invention showed many significant improvements compared to prior art flexography or gravure printed labels. The invention provides a printing method that is economically viable when printing short runs, as the cost of printing plates or printing cylinders are avoided. Because a thermal dye transfer system was used to print the labels, each label can be different without the need for expensive printing press setup costs. The use of thermal dye transfer images applied to a package ensures the highest image quality currently available compared to the common, but lower quality six-color rotogravure printed images. Applying the environmental protection layer to the thermal dye transfer imaging layers significantly improves the silver halide image toughness and allows the thermal dye transfer image to be used in demanding labeling applications such as shampoo bottles or wine bottles.

Thermal dye transfer image technology utilized in the example can simultaneously print text, graphics, and photographic quality images on the same label. Since the thermal dye transfer imaging layers of the invention are digitally compatible, text, graphics, and images can be printed using known digital printing equipment such as lasers and CRT printers. Because the silver halide system is digitally compatible, each package can contain different data elements enabling customization of individual packages without the extra expense of printing plates or cylinders. Further, printing digital files allows the image files to be transported using electronic data transfer technology such as the internet, thus reducing the amount of time required for a packaging label change. Typically, a packaging label change utilizing the traditional methods of printing plates and cylinders required 10 weeks from concept to finished labels. The invention allows changes to occur in less than 1 hour.

While this example was directed at thermal dye transfer printed images on the composite base, ink jet printing, electro-photographic printing and silver halide printing of the labels would yield the same superior result compared to prior art ink printed labels. Further, while this example was directed at labeling applications, the composite imaging element of the invention has utility for consumer photography, commercial mounting of images on back boards, bus wrap materials and album pages.

What is claimed is:

1. An imaging member comprising in order an imaging layer, an upper oriented polymer sheet, a laminating adhesive layer in contact with said upper polymer sheet and also in contact with a lower oriented polymer sheet, and a positioning adhesive in contact with the lower side of said lower polymer sheet.

2. The imaging member of claim 1 further comprising a carrier sheet in contact with said positioning adhesive.

3. The imaging member of claim 1 wherein said upper oriented polymer sheet comprises biaxially oriented polyolefin.

4. The imaging member of claim 1 wherein said upper oriented polymer sheet comprises biaxially oriented polypropylene.

5. The imaging member of claim 1 wherein said upper oriented polymer sheet comprises voids.

6. The imaging member of claim 1 wherein said upper oriented polymer sheet comprises white pigment.

7. The imaging member of claim 1 wherein said upper oriented polymer sheet has a thickness of between 12 and 100 microns.

8. The imaging member of claim 1 wherein said laminating adhesive provides a peel strength of greater than 150 g/5 cm between said upper polymer sheet and said lower polymer sheet.

9. The imaging member of claim 1 wherein said laminating adhesive comprises an acrylic adhesive.

10. The imaging member of claim 1 wherein said laminating adhesive has a thickness of greater than 10 microns.

11. The imaging member of claim 1 wherein said lower oriented polymer sheet comprises a polyester sheet.

12. The imaging member of claim 1 wherein said lower oriented polymer sheet has a thickness of between 12 and 100 microns.

13. The imaging member of claim 1 wherein said lower oriented polymer sheet has a stiffness of between 5 and 20 millinewtons.

14. The imaging member of claim 1 wherein said lower oriented polymer sheet is voided.

15. The imaging member of claim 1 wherein said positioning adhesive has an open time of greater than 2 weeks.

16. The imaging member of claim 1 wherein said positioning adhesive has an open time of less than 1 hour.

17. The imaging member of claim 1 wherein said imaging layer comprises photosensitive silver halide.

18. The imaging member of claim 1 wherein said imaging layer comprises an ink jet receiving layer.

19. The imaging member of claim 1 wherein said imaging layer comprises a thermal dye receiving layer.

20. The imaging member of claim 1 wherein said imaging member has a thickness of between 50 and 150 microns.

21. The imaging member of claim 1 wherein said imaging member further comprises a security feature located in a layer between said upper polymer sheet and said lower polymer sheet.

22. The imaging member of claim 1 wherein said security feature is in a layer located between said laminating adhesive and said lower polymer sheet.

* * * * *